3,467,680
Patented Sept. 16, 1969

3,467,680
METHOD OF ISOLATION OF CRUDE GRISEOFULVIN
Valjter Osvaljdovich Kuljbakh and Valentina Jakovlevna Raigorodskaja, Leningrad, U.S.S.R., assignors to Leningradsky Nauchno-Issledovateljsky Institute Antibiotikov, Leningrad, U.S.S.R.
No Drawing. Filed Feb. 18, 1965, Ser. No. 433,808
Int. Cl. C07d 5/32, 5/34
U.S. Cl. 260—346.2          4 Claims The present invention relates to the isolation of griseofulvin, more particularly, the isolation of crude griseofulvin.

Attempts made up to now to isolate crude griseofulvin of sufficient purity for obtaining the antibiotic for therapeutic purposes by means of a single crystallization have been unsuccessful.

The disadvantage of all previously known methods is the use of extractants which are non-selective in respect to griseofulvin, and are for the most part explosive and toxic: butanol and esters of acetic acid, preferably butyl acetate British Patent 784,618, trichloroethylene British Patent 795,039, and aqueous acetone British Patent 902,629.

As a result of the yield of the crude product according to the patent data is not more than 75% when extraction is carried out with butyl acetate, less than 80% with trichloroethylene, and 73–82% with aqueous acetone. The content of griseofulvin in the crude product is only 79.5% when extraction is done with butyl acetate, 80–92% with trichloroethylene and 70–94% with aqueous acetone.

We have found that the suitability of a solvent in the capacity of extractant is determined by its desorption characteristics which are based on its physico-chemical properties, i.e., permitivity, surface tension and capacity for dissolving water. Water increases the surface tension of a water-saturated extractant, thus diminishing desorption of water-insoluble substances. The best extractant is one characterized by the highest dielectric constant, lowest surface tension when saturated with water and lowest capacity for dissolving water, since water increases the surface tension and adversely affects desorption of water-insoluble substances.

We have found methylene chloride to be the best extractant for giseofulvin. Consequently, the method of extracting griseofulvin from the mycelium and culture fluid described in our U.S. Patent 3,160,640 is based on the use of methylene chloride as the extractant. In addition to the above the method of the present invention contemplates isolating griseofulvin by the application of techniques which are new in griseofulvin production, i.e., by clarification of the partially evaporated methylene chloride extract with dry acid charcoal which ensures absorption of phenolic impurities in the hydroxyl form, followed by freezing fluocculent impurities out of the partially evaporated extract and separation of said impurities.

We have now found that performing the last two operations in reverse order ensures isolation of crude griseofulvin of higher purity and in a higher yield as compared to our basic invention in the aforesaid U.S. patent.

Broadly, the object of the present invention is to produce crude griseofulvin of greater purity by changing the sequence of the technological operations in its isolation, i.e., first freezing impurities out of the partially evaporated methylene chloride extract and removing them from said extract, followed by clarification of the partially evaporated extract with charcoal, filtration and crystallization of the crude product after evaporating the extract until griseofulvin crystals begin to form.

According to the preferred embodiment of the invention, the flocculent brown impurities are frozen out of the methylene chloride extract when it has been evaporated to $\frac{1}{10}$ of the initial volume and before clarification of said extract with acid wood charcoal. A particular object of the invention is to provide a simple and efficient method of obtaining highly purified crude griseofulvin corresponding in assay 95% to the final product according to British Patent 784,618, and suitable for use as an antifungal preparation in agriculture: veterinary practice, agronomy, horiculture and truck farming, and also for medical purposes when purified according to our basic invention in the aforesaid U.S. patent.

An object of the present invention is to improve the quality of crude griseofulvin. Another object of the present invention is to provide a more economical and efficient method of isolating crude griseofulvin. Still another object of the invention is to improve the working conditions of the personnel in the isolation of crude griseofulvin.

According to the aforesaid and other objects, the present invention comprises a new method of isolating crude griseofulvin wherein the sequence of the technlogical operations according to our basic invention in the aforesaid U.S. patent is altered as hereinafter described.

As has been pointed out, the invention provides a method of obtaining highly purified crude griseofulvin with a high yield comprising preliminarily freezing the flocculent brownish proteinaceous and phenolic impurities out of the partially evaporated methylene chloride extract, separating said impurities by filtration an then clarifying the methylene chloride extract with charcoal.

In the preferred embodiment of the invention, the methylene chloride extract of crude griseofulvin is partially evaporated to $\frac{1}{10}$ of the initial volume and then cooled to +4° C. for preliminary removal of precipitated flocculent impurities which are filtered off on a pressure filter, while clarification is carried out by warming with 0.5% of dry acid birch charcoal, after which the spent charcoal is removed by filtering on a pressure filter, the clarified extract being evaporated approximately to $\frac{1}{15}$ its volume until crystals of griseofulvin begin to form and the extract then being cooled to 0° C., after which the crystals are filtered off and washed with cold acetone.

For a better understanding of the invention by those skilled in the art by following examples are given by way of illustration.

Example 1

21.3 kg. of moist mycelium with an activity of 4.8 micrograms per mg. are obtained from 300 liters of nutrient medium. This is extracted three times with 42.6, 21.3 and 21.3 liters of methylene chloride respectively. The combined extract is evaporated to $\frac{1}{10}$ of the initial volume and cooled to +4° C. The precipitated flocculent brownish impurities are separated on a pressure filter. The filtrate is clarified with 0.5% acid activated charcoal while warming to 35° C., using a reflux condenser; the spent charcoal is separated on the pressure filter and washed with methylene chloride taken in the amount of 2.5% of the filtrate. The clarified filtrate is evaporated to $\frac{1}{15}$ of the initial volume at a temperature not exceeding 50° C., and then cooled to 0° C.

The crystallized crude griseofulvin is removed in a centrifuge, washed with cold acetone taken in the amount of 10% of the filtrate by volume, and dried in a vacuum dried at 50° and a pressure of 25 mm. Hg. 102 g. of crude griseofulvin is obtained, i.e., a yield of 95%. Assay 95% (spectrophotometric determination); melting point 216–218° C.

Example 2

22 kg. of mycelium having an activity of 6 micrograms per mg. are obtained from 300 liters of nutrient medium.

The moist mycelium is extracted three times with 44, 22 and 22 liters of methylene chloride respectively. After partial evaporation, freezing out and removal of impurities, clarification with charcoal and removal of the latter, additional evaporation, crystallization, filtration and drying, 125 g. of crude griseofulvin is obtained, i.e., a yield of 95%. Assay 95%; melting point 216–218° C.

The present invention is applicable, in particular, in the antibiotic industry for producing crude griseofulvin used against pathogenic fungi in veterinary science and agronomy, and also for obtaining a medicinal preparation for oral treatment of widespread superficial mycosis. It should be pointed out that the present invention ensures enhanced purity of crude griseofulvin, owing to the altered sequence of the technological operations of removing impurities, as compared to our aforesaid U.S. patent. This permits obtaining a medicinal preparation through a single recrystallization, with a yield of 93% of the griseofulvin content in the crude product, or 88% of the content in the mycelium, the melting point being 220–222° C. and the assay 99% for the preparation, or over 99.5% for the dry preparation (spectrophotometric and polarimetric determinations). The product is in the form of white crystals which are free from a yellowish tint.

The invention enables the isolation of highly purified crude griseofulvin corresponding in assay to the medicinal preparation according to British Patent 784,618.

This is achieved by preliminarily freezing flocculent brownish proteinaceous impurities out of the partially evaporated methylene chloride extract and removing them by filtration, since they hamper effective absorption of pigments by acid activated charcoal. Absorption of phenolic impurities by acid activated charcoal, which follows separation of tarry substances by freezing them out, ensures isolation of crude griseofulvin having a melting point elevated by 6–8° C. and an assay increased by 7% i.e., having characteristics approaching the purity of the medicinal preparation as specified in the draft International Pharmacopoeia: melting point not lower than 218°; griseofulvin content not less than 97%. These specifications are easily achieved by a single recrystallization of the crude griseofulvin isolated according to the present invention.

What is claimed:

1. A method of isolating crude griseofulvin which comprises extracting the moist mycelium with methylene chloride, evaporating the combined methylene chloride extract, cooling said extract, separating flocculent impurities by filtration, warming the filtrate, clarifying said filtrate with acid charcoal, separating the spent charcoal from the clarified solution, isolating crude griseofulvin from said clarified solution by crystallization, and washing and drying the crystals thus obtained.

2. A method of isolating crude griseofulvin which comprises extracting the moist mycelium with methylene chloride, evaporating the combined methylene chloride extract, cooling said extract to a temperature of 4° C., separating flocculent impurities which are precipitated on cooling by filtration, warming the filtrate, clarifying said filtrate with acid charcoal, separating the spent charcoal from the clarified solution, isolating crude griseofulvin from said clarified solution by crystallization, and washing and drying the crystals thus obtained.

3. A method of isolating crude griseofulvin which comprises extracting the moist mycelium with methylene chloride, evaporating the combined methylene chloride extract to $\frac{1}{10}$ the initial volume, cooling said extract to a temperature of 4° C., separating flocculent impurities by filtration, warming the filtrate to 35° C., clarifying said filtrate with acid charcoal in the amount of 0.5% of the volume of the filtrate, separating the spent charcoal from the clarified solution, isolating crude griseofulvin from said clarified solution by crystallization, washing the crystals thus obtained with acetone and drying said crystals.

4. A method of isolating crude griseofulvin which comprises extracting the moist mycelium with methylene chloride, evaporating the combined methylene chloride extract to $\frac{1}{10}$ the initial volume, cooling said extract to a temperature of 4° C., separating flocculent impurities by filtration, warming the filtrate to 35° C., clarifying said filtrate with acid charcoal in the amount of 0.5% of the volume of the filtrate, separating the spent charcoal from the clarified solution, evaporating said clarified solution to $\frac{1}{15}$ the initial volume at a temperature not higher than 50° C. until crystals of griseofulvin begin to form, isolating crude griseofulvin by crystallization at 0° C., washing the crystals thus obtained with acetone and drying said crystals at 50° C.

References Cited

UNITED STATES PATENTS 3,160,640   12/1964   Coolbach et al. _ _ _ _ 260—346.2

ALEX MAZEL, Primary Examiner

B. I. DENTZ, Assistant Examiner

U.S. Cl. X.R.

260—999